(12) United States Patent
Han et al.

(10) Patent No.: US 9,227,844 B2
(45) Date of Patent: Jan. 5, 2016

(54) HEAT EXCHANGE REFORMER WITH DOUBLE-TUBES FOR REFORMING HYDROCARBONS

(75) Inventors: Pat A. Han, Bois Guilaume (FR); Niklas Bengt Jakobsson, Kågeröd (SE); Anders Helbo Hansen, Frederiksberg (DK)

(73) Assignee: Haldor Topsoe A/S, Lyngby (DK)

( * ) Notice: Subject to any disclaimer, the term of this patent is extended or adjusted under 35 U.S.C. 154(b) by 188 days.

(21) Appl. No.: 13/522,341

(22) PCT Filed: Jan. 18, 2011

(86) PCT No.: PCT/EP2011/000179
§ 371 (c)(1),
(2), (4) Date: Jul. 19, 2012

(87) PCT Pub. No.: WO2011/088982
PCT Pub. Date: Jul. 28, 2011

(65) Prior Publication Data
US 2012/0277327 A1    Nov. 1, 2012

(30) Foreign Application Priority Data

Jan. 19, 2010 (DK) ................................ 2010 00038
Apr. 27, 2010 (DK) ................................ 2010 00377

(51) Int. Cl.
*B01J 7/00* (2006.01)
*C01B 3/38* (2006.01)
*B01J 8/06* (2006.01)

(52) U.S. Cl.
CPC ............. *C01B 3/384* (2013.01); *B01J 8/067* (2013.01); *B01J 2208/0053* (2013.01); *B01J 2208/00212* (2013.01); *B01J 2208/00221* (2013.01); *B01J 2208/00371* (2013.01); *C01B 2203/025* (2013.01); *C01B 2203/0233* (2013.01); *C01B 2203/0244* (2013.01); *C01B 2203/0844* (2013.01); *C01B 2203/0877* (2013.01); *C01B 2203/1235* (2013.01); *C01B 2203/142* (2013.01)

(58) Field of Classification Search
CPC .................. B01J 19/2425; B01J 2208/00221; B01J 8/067; B01J 19/2415; B01J 8/06; B01J 8/062; B01J 8/065; B01J 2208/0053; B01J 2208/00212; B01J 8/0496; B01J 12/007; B01J 2219/185; B01J 2219/1943; C01B 3/384; C01B 2203/0833; C10G 9/20
See application file for complete search history.

(56) References Cited

U.S. PATENT DOCUMENTS

| 3,334,971 | A |   | 8/1967 | James et al. |
|---|---|---|---|---|
| 3,515,520 | A | * | 6/1970 | Hervert .................... 422/241 |
| 4,690,590 | A | * | 9/1987 | Nussbaumer et al. ........ 405/267 |
| 5,106,590 | A |   | 4/1992 | Hopper et al. |
| 5,167,933 | A |   | 12/1992 | Norsk |
| 5,429,809 | A | * | 7/1995 | Stahl et al. .................. 422/202 |
| 5,753,194 | A | * | 5/1998 | Heil et al. .................... 422/629 |

(Continued)

FOREIGN PATENT DOCUMENTS

DE    35 40 782 A1    5/1987
EP    0 194 067 A2    9/1986
(Continued)

*Primary Examiner* — Imran Akram
(74) *Attorney, Agent, or Firm* — Dickstein Shapiro LLP

(57) ABSTRACT

The invention relates to a process and apparatus for the production of synthesis gas from a hydrocarbon feedstock in a heat exchanger reformer, wherein a cooling medium is added to the heat exchange reformer.

2 Claims, 3 Drawing Sheets

(56) References Cited

U.S. PATENT DOCUMENTS

Figure 1:
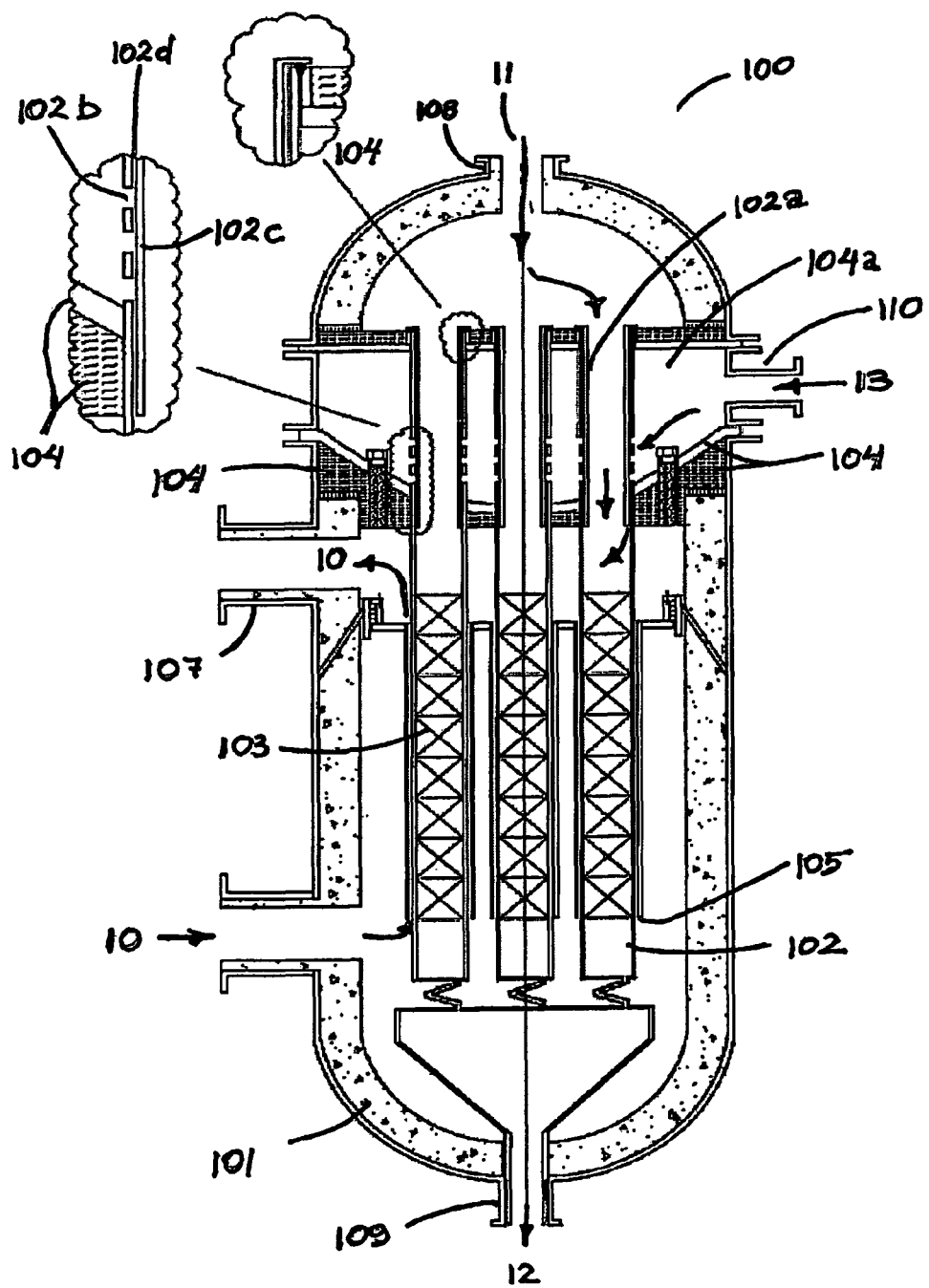

| | | | |
|---|---|---|---|
| 6,296,814 B1* | 10/2001 | Bonk et al. | 48/61 |
| 2004/0123523 A1* | 7/2004 | Rong et al. | 48/200 |
| 2005/0097819 A1* | 5/2005 | Lomax et al. | 48/127.9 |
| 2005/0287053 A1 | 12/2005 | Sakai et al. | |
| 2006/0188434 A1* | 8/2006 | Mahlendorf et al. | 423/652 |
| 2006/0191201 A1* | 8/2006 | Berggren et al. | 48/197 R |
| 2009/0087705 A1* | 4/2009 | Fuju et al. | 429/20 |
| 2009/0184293 A1 | 7/2009 | Han | |
| 2010/0178219 A1* | 7/2010 | Verykios et al. | 422/197 |

FOREIGN PATENT DOCUMENTS

| | | |
|---|---|---|
| EP | 0 535 505 A1 | 4/1993 |
| JP | 53-82690 A | 7/1978 |
| JP | 59-217605 A | 12/1984 |
| JP | S59-217605 A | 12/1984 |
| JP | S61-222903 A | 10/1986 |
| JP | 5-76748 A | 3/1993 |
| JP | 2005-53972 A | 3/2005 |
| JP | 2006-8480 A | 1/2006 |
| JP | 2007-229548 A | 9/2007 |
| RU | 2 053 957 C1 | 2/1996 |

* cited by examiner

HEAT EXCHANGE REFORMER WITH DOUBLE-TUBES FOR REFORMING HYDROCARBONS

The present invention relates to a process and apparatus for the production of gas rich in hydrogen, particularly synthesis gas for the production of ammonia, methanol, dimethyl ether (DME), hydrogen and hydrocarbons by Fischer-Tropsch synthesis. More particularly, the invention relates to a process for the production of synthesis gas by the use of heat exchange reforming in which a cooling medium is added and apparatus used for this purpose.

The use of a product stream of reformed gas as a source of heat in heat exchange reforming is known in the art. Thus, EP-A-0033128 and EP-A-0334540 deal with parallel arrangements, in which a hydrocarbon feed is introduced in parallel to a radiant furnace and heat exchange reformer. The partially reformed gas from the radiant furnace is then used as heat source for the reforming reactions in the heat exchange reformer.

In EP-A-0440258 we disclose a process in which the hydrocarbon feed is first passed through a first heat exchange reformer to provide a partially reformed stream. The partially reformed stream is then introduced in parallel to a radiant furnace and second heat exchange reformer. The product streams from both reformers are combined and introduced to an autothermal reformer. The product gas from the autothermal reformer is used as heat source in the second heat exchange reformer, while the product gas from said second heat exchange reformer is used as heat source in the first heat exchange reformer.

U.S. Pat. No. 4,376,717 and our US 2009/0184293 disclose a process in which a hydrocarbon feed is first passed through a radiant furnace (tubular reformer); the partially reformed gas is then subjected to heat exchange reforming and finally autothermal reforming. The product gas from the latter is used as heat source in the heat exchange reforming. In our US 2009/0184293 we found specifically that by providing a process in which the entire hydrocarbon feed is passed through a radiant furnace, heat exchanger reformer and autothermal reformer in a series arrangement, the risk of metal dusting is significantly reduced. In otherwise conventional processes such as heat exchange reformers in parallel or series with either a radiant furnace or autothermal reformer, metal parts of the heat exchange reformer experience low temperatures as effluent gas from the autothermal reformer cools during its passage through the heat exchange reformer. Accordingly, metal parts of the heat exchange reformer fall within the prohibitive range of metal dusting temperatures.

In JP 59217605 an apparatus having a shift reaction part for CO in addition to a reforming part in a body shell, capable of giving hydrogen from hydrocarbons in a compact apparatus is disclosed. Further apparatuses for the production of synthesis gas are described in U.S. Pat. No. 3,334,971 and US 2005287053.

We have now found that by providing a process and apparatus in which a process gas such as a hydrocarbon feed is passed through a heat exchanger reformer and a cooling medium is added to the heat exchange reformer separately from the actual process gas fed to this reformer, a considerably more inexpensive heat exchange reformer can be constructed.

In its broadest aspect the invention as defined in claim 5 provides a process for the production of synthesis gas from a hydrocarbon feedstock, the process comprising passing the hydrocarbon feedstock through a reforming stage in a heat exchange reformer which is provided with a plurality of catalyst tubes containing reforming catalyst in indirect heat conducting relationship with a heating medium, and withdrawing from the heat exchange reformer a synthesis gas in the form of a reformed hydrocarbon stream, characterised in that the process further comprises adding a cooling medium to the heat exchange reformer.

Particular embodiments of the invention are recited in sub-claims 6-12.

By the term "catalyst tubes" is meant tubes filled with catalyst, such as particulate catalyst thereby forming a fixed bed, or tubes in which the catalyst is adhered as coating or coated in a foil adapted to the inner perimeter of the tube, or tubes in which the catalyst is coated or impregnated on structural elements such as monoliths adapted within the tubes.

By "indirect heat conducting relationship" is meant that there is no direct contact between the catalyst and the heating medium, and thereby between the flow passing through the catalyst and the heating medium, because these are separated by a metal wall, i.e. the wall of the tube containing the catalyst.

The hydrocarbon feedstock is preferably mixed with steam prior to entering the heat exchange reformer.

Preferably, in connection with the above and one or more of the below embodiments the process further comprises adding the cooling medium directly to the tube supporting structure of the heat exchange reformer.

By the term "tube supporting structure" is meant the structure that is in direct contact with the external surface of the catalyst tubes and which mechanically fixes such tubes within the reformer. Hereinafter the tube supporting structure may also be referred as tube sheet.

Accordingly, the cooling medium is introduced at a point in the reactor where it can come into direct contact with the metal parts of the tube sheet and at the same time the external metal parts of the catalyst tubes traversing said tube sheet. Normally, the tube supporting structure (tube sheet) is positioned in the upper part of the heat exchange reformer. The cooling medium fills the upper chamber of the reformer created above the tube supporting structure and the tube structure is thereby cooled.

In another embodiment in connection with the above and one or more of the below embodiments the process further comprises mixing the cooling medium, preferably steam, in the heat exchange reformer with the hydrocarbon feedstock entering the heat exchange reformer. The cooling medium is preferably introduced to the heat exchange reformer at a point along the length of the heat exchange reformer corresponding to the level where the tube structure is located. Thereby the tube structure is cooled by immediate contact with the cooling medium. Steam may be derived from steam added to the hydrocarbon feedstock in an upstream first reforming stage, such as primary reforming in a Steam Methane Reformer (SMR).

Despite the fact that heat exchange reforming is an endothermic process and thereby requires the addition of energy, the addition of the cooling medium, preferably a cooling gas such as steam to the heat exchange reformer creates a cold end in the metal parts of the reformer which makes it possible to construct a tube support that is mechanically stable and to use materials that are not specially developed to withstand metal dusting, while at the same time the reforming performance is not impaired.

Preferably, the cooling medium makes contact with the hydrocarbon feedstock outside the catalyst tubes. The cooling medium permeates through the tube structure, for instance through one or more apertures provided therein, and passes through a zone of the heat exchange reformer outside the catalyst tubes where the cooling medium can be mixed with the incoming hydrocarbon feedstock (feed gas), thereby producing a hydrocarbon-steam mixture which subsequently comes into contact with the catalyst arranged within the catalyst tubes; see also FIG. 2. More preferably, the cooling medium makes contact with the hydrocarbon feedstock inside the catalyst tubes, most preferably before contact with catalyst in the tubes. The cooling medium passes into the inside of the catalyst tubes through one or more apertures provided in the upper portion of the catalyst tubes at a level substantially corresponding to the level where the tube structure is positioned and which is normally above the level where the catalyst fills the catalyst tubes; see FIG. 1. In either of the above ways, i.e. outside or inside the catalyst tubes, the cooling medium is in heat conducting relationship with the tube structure and in fluid communication with the catalyst within the catalyst tubes.

In yet another embodiment of the invention in connection with one or more of the above or below embodiments, the process further comprises passing the synthesis gas from the heat exchange reformer through an autothermal reforming stage (ATR) (or secondary reforming stage) provided with a fixed bed of catalyst, or partial oxidation stage (POx) optionally provided with a fixed bed of catalyst, withdrawing a hot effluent stream of synthesis gas of which at least a portion is used as the heating medium in the heat exchange reformer, and withdrawing from the heat exchange reformer a final stream of cooled synthesis gas. Thereby it is possible to further reform the synthesis gas from the heat exchange reformer and use the further reformed gas as heating medium in the heat exchange reformer. The thus cooled further reformed gas is subsequently used as synthesis gas for ammonia, methanol, dimethyl ether (DME), hydrocarbons by Fischer-Tropsch synthesis, or hydrogen, as defined in sub-claim 12.

It would be understood for a person skilled in the art that when producing ammonia, the autothermal reforming stage (ATR) is actually a secondary reforming stage.

In some instances, the partial oxidation stage (POx) is conducted without catalyst, but preferably the partial oxidation stage (POx) is provided with a fixed bed of catalyst.

The invention encompasses also a heat exchange reformer used in the process. Accordingly, as recited in claim 1 we provide an apparatus (100) for the production of synthesis gas from a hydrocarbon feedstock, comprising outer shell (101); a plurality of vertically disposed catalyst tubes (102) containing reforming catalyst (103) which fill a portion of the catalyst tubes (102); a catalyst tube supporting structure (104) arranged above the level where the catalyst (103) fills the tubes (102); means (105) for heating the catalyst tubes (102) indirectly with a heat exchanging medium (10); inlet conduct (106) for the introduction of said heat exchanging medium (10); outlet conduct (107) for the withdrawal of said heat exchanging medium after having delivered heat to the catalyst (103) arranged within the catalyst tubes (102); inlet conduct (108) for introduction of hydrocarbon feedstock (11) and which is in fluid communication with catalyst (103) arranged within the catalyst tubes (102); outlet conduct (109) for the withdrawal of synthesis gas (12) after having passed through the catalyst tubes (102); inlet conduct (110) for the introduction of cooling medium (13) in which said cooling medium (13) is in heat conducting relationship, preferably direct heat conducting relationship, with the catalyst tube structure (104) and in fluid communication with the catalyst (103) within the catalyst tubes (102).

By the term "in fluid communication with the catalyst" is meant that the fluid, such as the hydrocarbon feedstock, makes direct contact with the catalyst. It would thus be understood that since the cooling medium also is in fluid communication with the catalyst, the cooling medium and the hydrocarbon feedstock are in fluid communication with each other.

The term "heat conducting relationship" encompasses direct and indirect heat transfer. Thus, the term "direct heat conducting relationship" covers heat transfer where the cooling medium is in direct contact with the tube structure, i.e. direct contact with the metal parts of the tube structure, thereby providing rapid cooling and protecting such metal parts. Normally, heat exchange reformers situated between a Steam Methane Reformer (SMR) and an Autothermal Reformer ATR (or secondary reformer) are very hot: hydrocarbon feedstocks entering heat exchange reformers have temperatures in the range 750 and 1030° C., which are temperatures at which the metal parts begin to suffer and loose strength. The cooling medium, preferably steam, can be added at a much lower temperature, normally 380° C. The steam can flow out of the heat exchange reformer, but preferably it is introduced in the reforming flow passing through the catalyst tubes and which will benefit from this. The tube supporting structure can then be constructed of inexpensive materials, e.g. materials other than Inconel since the temperature of the tube supporting structure can be significantly reduced, e.g. down to 400-450° C. When the cooling medium transfers its heat to the tube structure through a surface in between, the heat conducting relationship is said to be indirect.

In connection with one or more of the above or below embodiments, the heat exchange reformer is preferably selected from a bayonet tube type reactor, tube and shell heat exchanger and double-tube reactor with catalyst disposed inside the double tubes, catalyst disposed outside the double tubes, and catalyst disposed outside and inside the double tubes.

In a particular embodiment of the bayonet tube type reactor, at least one catalyst tube (reformer tube) in this reformer is provided in the form of an outer and an inner tube, the outer tube being a U-shaped tube and provided with a reforming catalyst, the inner tube being adapted concentrically to withdraw an effluent stream of partly reformed hydrocarbon from the outer tube, the outer tube being concentrically surrounded by a sleeve spaced apart the outer tube and being adapted to pass the hot effluent stream from the autothermal reformer (or secondary reformer) in indirect heat conducting relationship with reacting feedstock in the outer tube by conducting the hot effluent stream in the space between the sleeve and the outer tube.

For the bayonet tube type reactor, the steam in the chamber is mixed outside the catalyst tubes. The steam makes direct contact with the tube structure, engulfs the portion of all the catalyst tubes traversing the tube structure, permeates the tube structure through for instance an aperture close to the catalyst tube, and mixes with incoming feed gas. The combined gas enters at the top of the catalyst tubes and continues its flow downward inside the catalyst tubes. Because of the higher pressure of the steam in the chamber, the steam is forced to enter into the catalyst tubes and thereby participate in the reforming reaction.

Where the heat exchange reformer is a tube and shell heat exchanger, it is preferred that the partly reformed stream leaving the catalyst tubes in the heat exchange reformer is conducted to the autothermal reformer (or secondary reformer), while the hot effluent gas from the autothermal reformer is conducted through the shell side of the heat exchange reformer for indirect heating of reforming reactions proceeding within the catalyst tubes.

Where the heat exchange reformer is a double-tube reactor with catalyst disposed inside the double tubes, catalyst disposed outside the double tubes, and catalyst disposed outside and inside the double tubes, effluent gas from the autothermal reforming stage passes through the annular region of the double tubes, while the gas to be further reformed is conducted through the catalyst arranged inside the double tubes and optionally also outside the double tubes. A double-tube is basically an arrangement of two substantially concentric tubes. The space in between the tubes walls defines the annular region through which a heat-exchanging medium flows, in this case effluent from the autothermal reforming stage (or secondary reforming stage).

In particular, where the heat exchange reformer is a double-tube reactor with catalyst disposed inside the double-tubes, such catalyst tubes may also be defined by a single catalyst tube surrounded by a sleeve or metal shroud which is spaced apart the catalyst tube and which creates an annular region through which the heating medium can pass. The sleeve or metal shroud need not to be a part of the catalyst tube as such, but serve to create the annular region. In this type of reformer, the steam rather than engulfing all tubes as in the bayonet type reformer, simply enters each catalyst tube through tube apertures such as slots provided along the length of the upper portion of the catalyst tubes. Steam mixes with the hydrocarbon feedstock entering at the top of the tubes inside the catalyst tubes in order to participate in the reforming reaction taking place downstream where the combined gas contacts the catalyst. In a more specific embodiment the invention, as defined in sub-claim 11, also encompasses an apparatus in which the heat exchange reformer is a double-tube reactor with catalyst disposed inside the double tubes, wherein the cooling medium 13 enters each catalyst tube 102 through tube apertures 102b provided along the length of the upper portion 102a of the catalyst tubes 102 and mixes with the hydrocarbon feedstock 11 entering at the top of the catalyst tubes 102, and wherein means 102c such as metal shroud or sleeve extends along this upper portion 102a of the catalyst tubes 102 and create a space 102d along the length of the catalyst tubes 102 for the passage of the cooling medium 13. The cooling medium will then be in direct contact with the tube structure 104, thereby further cooling the tube structure. The upper portion 102a of the catalyst tubes 102 is defined by the portion of the catalyst tubes which traverse the tube structure 104 (see e.g. FIG. 1).

In a particular embodiment of the invention, in biomass gasification, a gasifier producing a synthesis gas containing CO, CO2, H2, H2O, CH4, higher hydrocarbons, ammonia and tars at ca 850 C is treated using tar reforming in 1 or 2 steps. The tar decomposition could take place at around 750 C where heavy tars would be decomposed. However if the synthesis gas is to be used for production of liquids such as FT diesel, TIGAS gasoline, DME, MeOH etc it is crucial to reduce the methane slip i.e the methane content in the synthesis gas in order to limit the purge from the synthesis loop. This can be done in a heated reformer. However standard reforming reactors cannot operate with inlet temperatures around 750 C. For this purpose it would be attractive to use the steam cooled heat exchange reformer according to this invention. In this embodiment, the reactor could be heated with for example flue gas from combustion of tail gas from the synthesis.

FEATURES OF THE INVENTION

1. Process for the production of synthesis gas from a hydrocarbon feedstock, the process comprising passing the hydrocarbon feedstock through a reforming stage in a heat exchange reformer which is provided with a plurality of catalyst tubes containing reforming catalyst in indirect heat conducting relationship with a heating medium, and withdrawing from the heat exchange reformer a synthesis gas in the form of a reformed hydrocarbon stream, characterised in that the process further comprises adding a cooling medium to the heat exchange reformer.

2. Process according to feature 1 comprising adding the cooling medium directly to the tube supporting structure of the heat exchange reformer.

3. Process according to feature 1 or 2 wherein the process further comprises mixing the cooling medium in the heat exchange reformer with the hydrocarbon feedstock entering the heat exchange reformer.

4. Process according to any of features 1 to 3, wherein the cooling medium is steam.

5. Process according to feature 3 or 4 wherein the cooling medium makes contact with the hydrocarbon feedstock outside the catalyst tubes.

6. Process according to feature 3 or 4 wherein the cooling medium makes contact with the hydrocarbon-mixture inside the catalyst tubes.

7. Process according to any of features 1 to 6 further comprising passing the synthesis gas from the heat exchange reformer through an autothermal reforming stage (ATR) provided with a fixed bed of catalyst, or partial oxidation stage (POx), withdrawing a hot effluent stream of synthesis gas of which at least a portion is used as the heating medium in the heat exchange reformer, and withdrawing from the heat exchange reformer a final stream of cooled synthesis gas.

8. Process according to feature 7 further comprising converting the effluent of synthesis gas of step (b) into ammonia synthesis gas, methanol synthesis gas, DME synthesis gas, synthesis gas for production of hydrocarbons by Fischer-Tropsch synthesis, or hydrogen.

9. Apparatus (100) for conducting the process of any of features 1 to 8 comprising outer shell (101); a plurality of vertically disposed catalyst tubes (102) containing reforming catalyst (103) which fill a portion of the catalyst tubes (102); a catalyst tube supporting structure (104); means (105) for heating the catalyst tubes (102) indirectly with a heat exchanging medium (10); inlet conduct (106) for the introduction of said heat exchanging medium (10); outlet conduct (107) for the withdrawal of said heat exchanging medium after having delivered heat to the catalyst (103); inlet conduct (108)for introduction of hydrocarbon feedstock (11) and which is in fluid communication with catalyst (103) arranged within the catalyst tubes (102); outlet conduct (109) for the withdrawal of synthesis gas (12) after having passed through the catalyst tubes (102); inlet conduct (110) for the introduction of cooling medium (13) in which said cooling medium (13) is in heat conducting relationship with the catalyst tube structure (104) and in fluid communication with the catalyst (103) arranged within the catalyst tubes (102).

10. Apparatus according to feature 9 in the form of a heat exchange reformer selected from:
   a bayonet tube type reactor,
   tube and shell heat exchanger,
   a double-tube reactor with catalyst disposed inside the double tubes,
   a double-tube reactor with catalyst disposed outside the double tubes,
   a double-tube reactor with catalyst disposed inside and outside the double tubes.

11. Apparatus (100) according to feature 9 or 10, in which the heat exchange reformer is a double-tube reactor with catalyst disposed inside the double tubes, wherein the cooling medium (13) enters each catalyst tube (102) through tube apertures (102b) provided along the length of the upper portion (102a) of the catalyst tubes (102) and mixes with the hydrocarbon feedstock (11) entering at the top of the catalyst tubes (102), and wherein means 102c extends along this upper portion (102a) of the catalyst tubes (102) and create a space 102d along the length of the catalyst tubes (102) for the passage of the cooling medium 13.

12. Apparatus (100) according to feature 9 or 10, in which the heat exchange reformer is a shell and tube heat exchanger with baffles in which catalyst is disposed inside the tubes, wherein the cooling medium (13) enters each catalyst tube (102) through tube apertures (102b) provided along the length of the upper portion (102a) of the catalyst tubes (102) and mixes with the hydrocarbon feedstock (11) entering at the top of the catalyst tubes (102), and wherein means 102c extend along this upper portion (102a) of the catalyst tubes (102) and create a space 102d along the length of the catalyst tubes (102) for the passage of the cooling medium 13.

Figure 2:
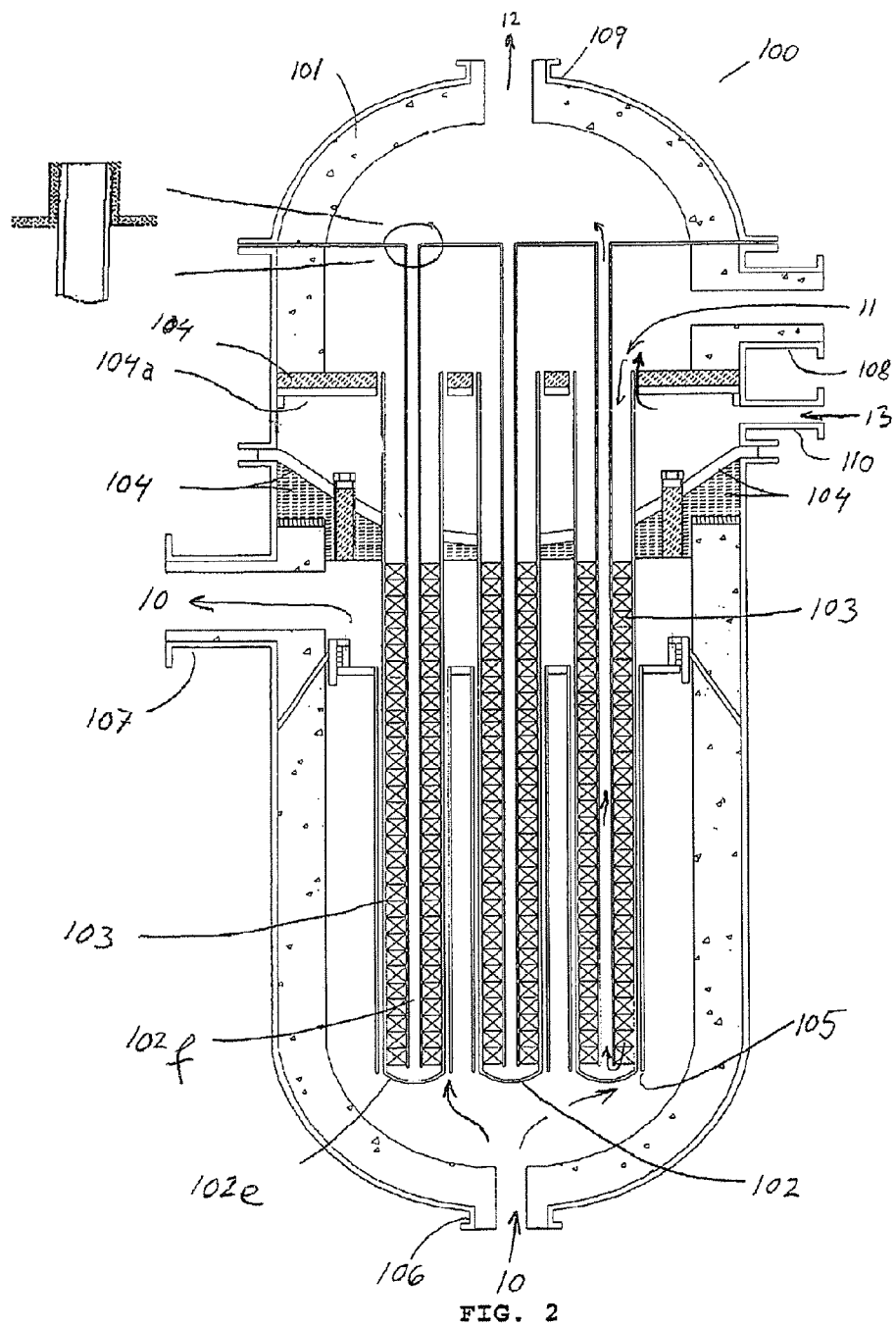

The accompanying figures show particular embodiments of the apparatus of the present invention in the form of a heat exchanging reformer of the double-tube type with catalyst inside the tubes (FIG. 1) and heat exchange reformer of the bayonet tube type (FIG. 2).

In FIG. 1 heat exchange reformer 100 comprises outer shell 101; a plurality of vertically disposed catalyst tubes 102 containing reforming catalyst 103 which fill a portion of the catalyst tubes 102; and a catalyst tube supporting structure 104 arranged above the level where the catalyst 103 fills the tubes 102. The tube supporting structure 104 defines upper chamber 104a which is traversed by the upper portion 102a of catalyst tubes 102. The reformer 100 comprises also means 105 for heating the catalyst tubes 102 indirectly with a heat exchanging medium 10. The means 105 can be in the form of a sleeve or metal shroud extending along the length of catalyst tubes 102 and up to about the same level as the level up to which catalyst 103 fills tubes 102, thereby forming an annular region for the passage of the heating medium 10. The reformer 100 comprises therefore also inlet conduct 106 for the introduction of said heat exchanging medium 10 entering normally at 1030° C. as effluent gas from autothermal reforming (or secondary reforming); outlet conduct 107 for the withdrawal of said heat exchanging medium 10 at normally 825° C. after having delivered heat to the catalyst 103 arranged within the catalyst tubes 102 and after having passed the annular region created between the means 105 and the catalyst tubes 102. This cooled synthesis gas 10 is passed to downstream equipment such as waste heat boilers and is subsequently used in downstream applications, such as methanol synthesis, DME synthesis, ammonia synthesis and Fischer-Tropsch synthesis. The reformer 100 comprises also inlet conduct 108 for introduction of hydrocarbon feedstock 11 entering normally at 750° C. if withdrawn from an upfront Steam Methane Reformer (SMR), and which is in fluid communication with catalyst 103 arranged within the catalyst tubes 102. An outlet conduct 109 is provided for the withdrawal of synthesis gas 12 at normally 810° C. after having passed through the catalyst tubes 102. The synthesis gas can be further reformed downstream in an autothermal reformer (or secondary reformer). An inlet conduct 110 for the introduction of cooling medium 13 is provided. This cooling medium 13 is normally a coolant gas such as steam at about 380° C. which is in heat conducting relationship with the catalyst tube structure 104 and in fluid communication with the catalyst 103 arranged within the catalyst tubes 102. Steam 13 passes through apertures 102b provided along the length of the upper portion 102a of the catalyst tubes 102. A metal shroud or sleeve 102c extends along the upper portion 102a of the catalyst tubes and thereby along the length where the apertures 102c are provided. The provision of the metal shroud or sleeve 102c creates a space 102d along the length of the upper portion 102a of the catalyst tube 102 and accordingly along the length of the catalyst tube 102 which is in direct contact with the tube structure 104. Space 102d allows the passage of the cooling medium, steam 13, thereby further cooling the tube structure 104.

In FIG. 2, heat exchange reformer 100 is of the bayonet tube type and comprises outer shell 101; a plurality of vertically disposed catalyst tubes 102 containing reforming catalyst 103 which fill a portion of the catalyst tubes 102. The catalyst tubes 102 are provided in the form of double-tubes with an outer and an inner tube, the outer tube 102e being a U-shaped tube and provided with catalyst 103, the inner tube 102f at the centre has no catalyst and is adapted to withdraw an effluent stream of partly reformed hydrocarbon from the outer tube 102 e as depicted by the arrows. A catalyst tube supporting structure 104 is arranged above the level where the catalyst 103 fills the tubes 102. The tube supporting structure 104 defines upper chamber 104a which is traversed by the upper portion of catalyst tubes 102. The reformer 100 comprises also means 105 for heating the catalyst tubes 102 indirectly with a heat exchanging medium 10. The means 105 is in the form of sleeve or metal shroud which concentrically surrounds outer tube 102e and extends along the length of catalyst tubes 102 and up to about the same level as the level up to which catalyst 103 fills tubes 102. The sleeve or metal shroud 105 forms thereby an annular region for the passage of the heating medium 10. The reformer 100 comprises therefore also inlet conduct 106 for the introduction of said heat exchanging medium 10 entering normally at 1030° C. as effluent gas from a secondary or autothermal reforming (or autothermal reforming) which passes through such annular region defined by the space between the means 105 and the outer tube 102 e. An outlet conduct 107 is provided for the withdrawal of said heat exchanging medium 10 at normally 825° C. after having delivered heat to the catalyst 103 arranged within the catalyst tubes 102 and after having passed the annular region created between the means 105 and the catalyst tubes 102. The cooled synthesis gas 10 is passed to downstream equipment such as waste heat boilers and is subsequently used in downstream applications, such as methanol synthesis, DME synthesis, ammonia synthesis and Fischer-Tropsch synthesis. The reformer 100 comprises also inlet conduct 108 for introduction of hydrocarbon feedstock 11 entering normally at 750° C. if withdrawn from an upfront Steam Methane Reformer (SMR), and which is in fluid communication with catalyst 103 arranged within the catalyst tubes 102. An outlet conduct 109 is provided at the top of the reformer 100 for the withdrawal of synthesis gas 12 at normally 810° C. after having passed through the catalyst tubes 102. The synthesis gas 12 can be further reformed downstream in a secondary reformer (or autothermal reformer). An inlet conduct 110 for the introduction of cooling medium 13 is provided. This cooling medium 13 is normally steam at about 380° C. which is in heat conducting relationship with the catalyst tube structure 104 and in fluid communication with the catalyst 103 arranged within the catalyst tubes 102. For this reformer of the bayonet tube type, steam 13 is mixed outside the catalyst tubes 102, as depicted by the arrows. The steam makes direct contact with the tube structure, engulfs the portion of all the catalyst tubes traversing the tube structure, and permeates the tube structure before mixing with incoming feed gas 11. The combined gas enters at the top of the catalyst tubes and continues its flow downward inside the catalyst tubes. Because of the higher pressure of the steam in the chamber, the steam is forced to enter into the catalyst tubes and thereby participate in the reforming reaction.

Figure 3:
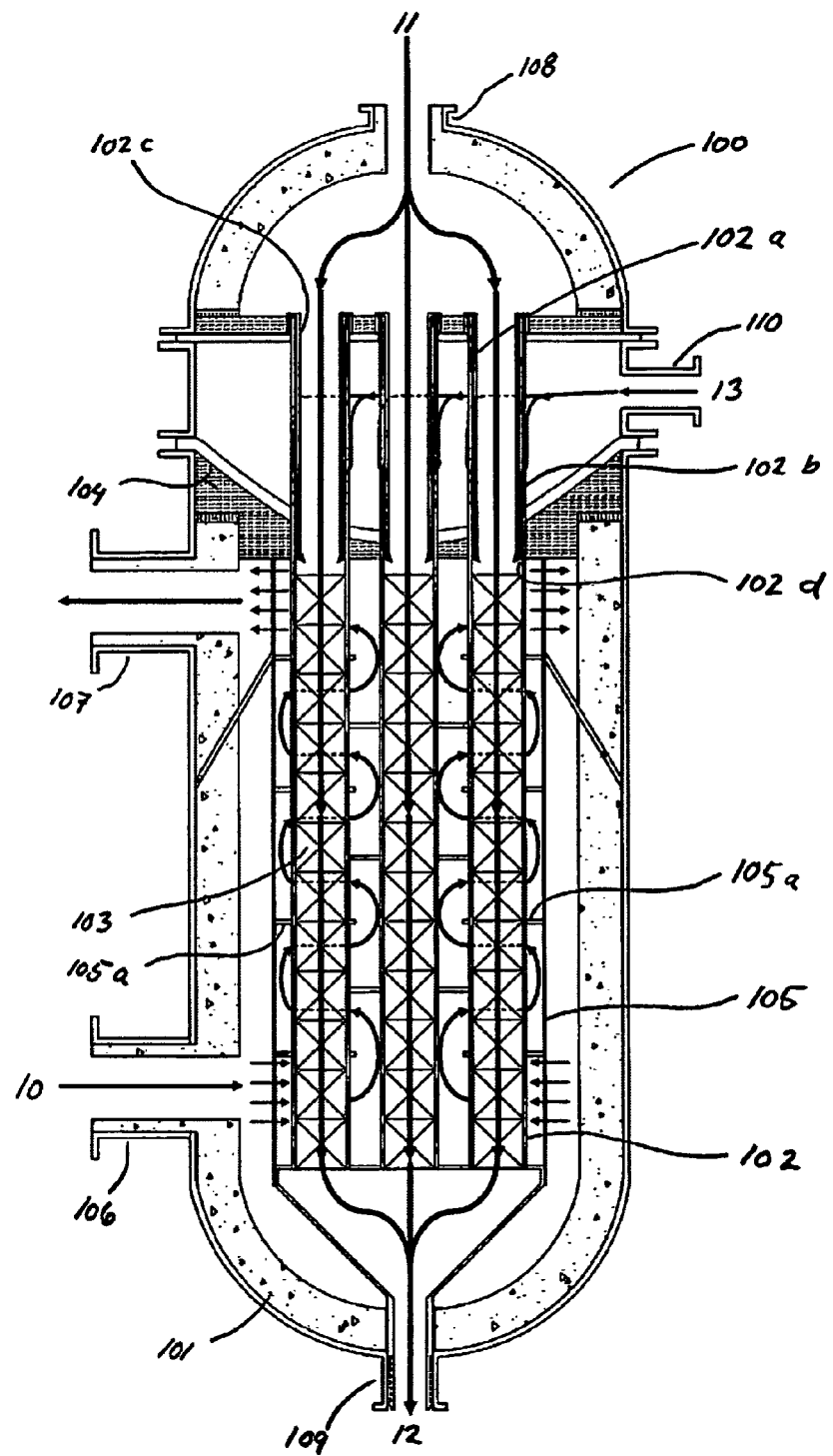

In FIG. 3 the heat exchange reformer 100 is shown in an embodiment where baffles make the heat exchange between the heat exchanging medium 10 and the catalyst tubes 102 more efficient. As seen on FIG. 1 the baffles forces the heat exchanging medium 10 to flow in a zigzag-movement and pass the catalyst tubes 102 in a substantially perpendicular direction relative to the length axis of the catalyst tubes 102. The baffle-construction provides an efficient heat exchange, and surprisingly calculations show that the baffle configuration can reduce the cost of the reactor by up to 50%.

The invention claimed is:

1. A heat exchange reformer for conducting a process for the production of synthesis gas from a hydrocarbon feedstock, comprising:
   an outer shell;
   a plurality of vertically disposed catalyst tubes containing reforming catalyst which fill a portion of the catalyst tubes;
   a catalyst tube supporting structure;
   means for heating the catalyst tubes indirectly with a heat exchanging medium;
   an inlet conduct for the introduction of said heat exchanging medium;
   an outlet conduct for the withdrawal of said heat exchanging medium after having delivered heat to the catalyst;
   an inlet conduct for introduction of hydrocarbon feedstock and which is in fluid communication with catalyst arranged within the catalyst tubes;
   an outlet conduct for the withdrawal of synthesis gas after having passed through the catalyst tubes;
   an inlet conduct for the introduction of cooling medium in which said cooling medium is in heat conduction relationship with the catalyst tube structure and in fluid communication with the catalyst arranged within the catalyst tubes,
   in which the heat exchange reformer is a double-tube reactor with catalyst disposed inside the double tubes, wherein the cooling medium enters each catalyst tube through tube apertures provided along the length of the upper portion of the catalyst tubes and mixes with the hydrocarbon feedstock entering at the top of the catalyst tubes, and wherein a metal shroud or sleeve extends along the upper portion of the catalyst tubes, in the same location as the tube apertures, and creates a space along the length of the catalyst tubes for the passage of the cooling medium.

2. The heat exchange reformer according to claim 1 in the form of a heat exchange reformer selected from:
   a bayonet tube type reactor,
   tube and shell heat exchanger and
   a double-tube reactor with catalyst disposed inside and outside the double tubes.

* * * * *